United States Patent [19]

Komatsu et al.

[11] Patent Number: 4,676,667
[45] Date of Patent: Jun. 30, 1987

[54] VARIABLE PRELOAD SHAFT BEARING FOR TURBOCHARGER

[75] Inventors: Hiroshi Komatsu, Yokosuka; Ken Yamane, Yokohama, both of Japan

[73] Assignee: Nissan Motor Co., Ltd., Japan

[21] Appl. No.: 838,453

[22] Filed: Mar. 11, 1986

[30] Foreign Application Priority Data

Mar. 13, 1985 [JP] Japan ................................. 60-51233

[51] Int. Cl.⁴ .............................................. F16C 25/06
[52] U.S. Cl. ..................................... 384/99; 384/517; 384/536
[58] Field of Search ................. 384/99, 517, 536, 474, 384/535, 563

[56] References Cited

U.S. PATENT DOCUMENTS 3,716,280 2/1973 Leibensperger et al. ............. 384/99
3,738,719 6/1973 Langner ............................... 384/517
4,342,488 8/1982 Anderson et al. .................... 384/99
4,400,098 8/1983 Lacey .................................... 384/99

*Primary Examiner*—Lenard A. Footland
*Attorney, Agent, or Firm*—Leydig, Voit & Mayer

[57] ABSTRACT

A rotating shaft of a turbocharger is supported by two rolling bearings enclosed in a bearing housing. Two collar members are interposed between the housing and bearings for supporting the bearings in the housing. A U-shaped preloading member is interposed between the two collar members in such a manner that the U-shaped member forms an oil chamber therein. The U-shaped member receives a pressure of a lubricating oil supplied to the oil chamber from an engine, and expands to puch the rolling bearings through the collar members with a greater force when the engine speed is high, and therefore, the oil pressure is high.

8 Claims, 7 Drawing Figures

VARIABLE PRELOAD SHAFT BEARING FOR TURBOCHARGER

BACKGROUND OF THE INVENTION

The present invention relates to a structure for supporting a rotating shaft of a turbocharger, and particularly to a bearing structure having rolling contact bearings.

In one conventional example of a bearing structure for a turbocharger of an engine, each rolling bearing is preloaded in a thrust direction by a preloading spring whose spring constant is chosen as being great enough to receive maximum thrust of a rotating shaft of the turbocharger. In this structure, however, a preload applied on each rolling bearing is constant, and therefore it becomes excessive in a low engine speed range. As a result, frictional resistance of each rolling bearing is increased, and performance of the turbocharger especially in the low engine speed range is deteriorated.

SUMMARY OF THE INVENTION

It is an object of the present invention to provide a bearing structure of a turbocharger which can preload each rolling bearing with a force which is variable in dependence on engine rpm.

According to the present invention, a bearing structure of a turbocharger for an internal combustion engine comprises a stationary bearing housing, at least two (, first and second,) rolling bearings for supporting a rotating shaft, at least two (, first and second,) collar members, and preloading means. The bearing housing is formed with at least one fluid passage for conveying a lubricating oil from the engine. The first collar member is interposed between the housing and the first bearing, and the second collar member is interposed between the housing and second bearing in such a manner that the first and second bearings are supported by the bearing housing through the first and second collar members. The preloading means is disposed between the first and second collar members. The preloading means forms an oil chamber which receives the lubricating oil supplied from the engine through the fluid passage of the housing, and pushes each of the first and second collar members with a force whose magnitude is variable in dependence on an oil pressure in the oil chamber.

Preferably, the preloading means comprises a U-shaped member having a U-shaped cross section opening radially outwardly, and forming the oil chamber therein.

DETAILED DESCRIPTION OF THE INVENTION

Figure 5:
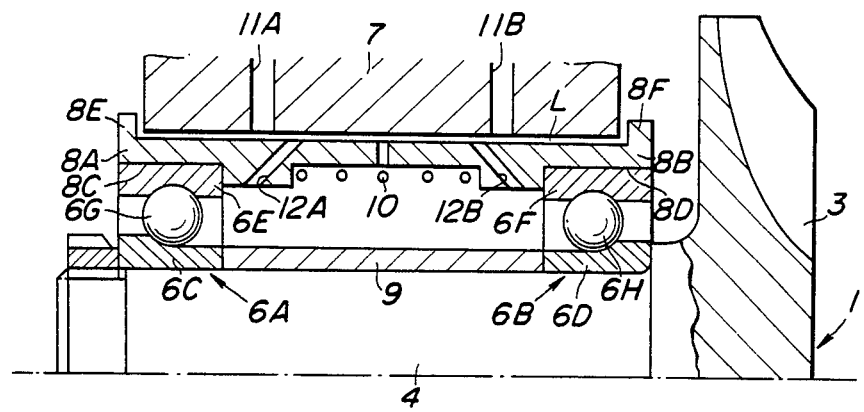
FIG. 5 is an upper half of a vertical sectional view showing a conventional bearing structure.
Figure 6:
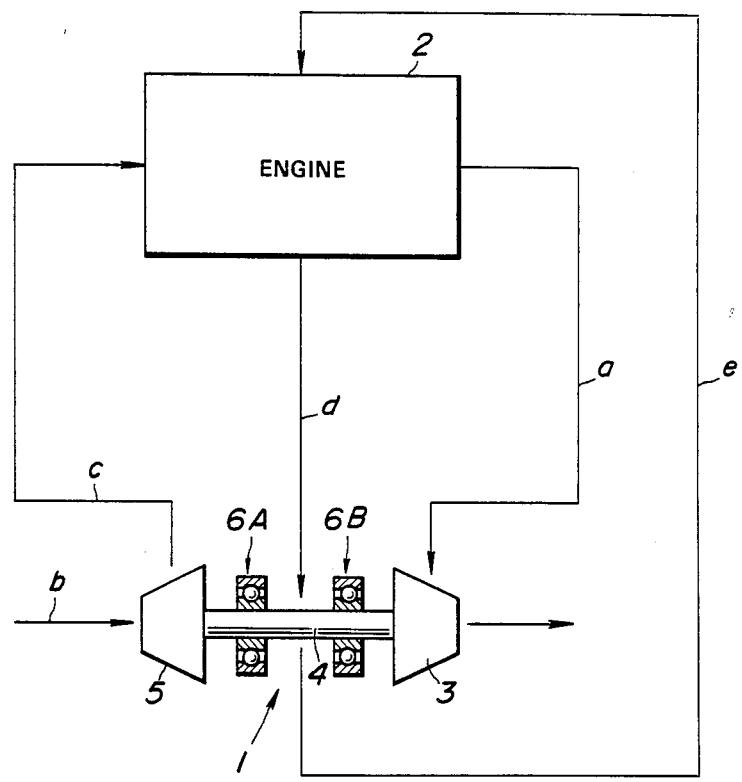
FIG. 6 is a schematic view showing a relation between a turbocharger and an engine.

FIGS. 5 and 6 show a conventional type bearing structure of a turbocharger as disclosed in Seiho YAMAMOTO "Rolling Bearing Influence of Vibrations of High-speed Rotor" published in "Jidōsha Gijutsu", Journal of the Society of Automotive Engineers of Japan, Vol 37, No. 12, page 1388 (cf. FIG. 11), 1983.

As shown in FIG. 6, a turbocharger 1 is connected with an engine 2. The turbocharger 1 has a turbine wheel 3 and a compressor wheel 5 mounted on a common rotating shaft 4. Energy of exhaust gases of the engine 2 drives the turbine wheel 3 which, in turn, drives the compressor wheel 5 through the shaft 4. The compressor wheel 5 pressurizes intake air supplied to the engine 2.

As shown in FIG. 5, the shaft 4 is rotatably supported on a bearing housing 7 by a pair of first and second rolling bearings 6A and 6B of an angular contact type. A pair of first and second collar members 8A and 8B is inserted between the bearing housing 7 and the bearings 6A and 6B in such a manner that there is formed a predetermined radial clearance L between the housing 7 and the collar members 8A and 8B. Each of the first and second bearings 6A and 6B has an inner ring 6C or 6D, an outer ring 6E or 6F, and rolling elements 6G or 6H. A fixing member 9 of a hollow cylinder shape is mounted on the shaft 4. Each of the inner rings 6C and 6D is fixed to a mounting portion of the shaft 4 through the fixing member 9. Each of the collar members 8A and 8B has an annular groove 8C or 8D formed in the inner circumference. Each of the outer rings 6E and 6F is inserted in the annular groove 8C or 8D of the corresponding collar member 8A or 8B, so that each of the outer rings is supported by the corresponding collar member.

A preloading spring 10 is disposed under compression between the first and second collar members 8A and 8B. The spring 10 always applies a preload of a constant magnitude on the rolling bearings 6A and 6B through the collar members 8A and 8B, respectively. Each of the rolling bearings 6A and 6B is positioned in a thrust direction parallel to the axis of the shaft 4 by the preload of the spring 10. Each of the collar members 8A and 8B is integrally formed with a flange 8E or 8F which projects radially outwardly from one end of the collar member. A thrust force acting in the axial direction of the shaft 4 is received by each of the flanges 8E and 8F.

The bearing housing 7 is formed with fluid passages 11A and 11B for supplying a lubricating oil. These passages 11A and 11B open into the clearance L. An oil film is formed in the clearance L by the oil supplied into the clearance L through the passages 11A and 11B. Each of the collar members 8A and 8B is formed with an inclined hole (nozzle) 12A or 12B extending from the clearance L toward the rolling elements of the corresponding rolling bearing 6A or 6B. The lubricating oil is carried from the clearance L through the inclined holes 12A and 12B, and discharged toward the rolling elements of the rolling bearings 6A and 6B.

While the turbine wheel 3 is driven by energy of exhaust gases of the engine 2 (as shown by an arrow a in FIG. 6), the compressor wheel 5 connected with the turbine wheel 3 by the shaft 4 pressurizes an intake air (arrow b), and supplies pressurized air (arrow c) to the engine 2 to increase the output torque of the engine 2 and to improve the accelerating ability of a vehicle. During this, the shaft 4 is rotatably supported by the rolling bearings 6A and 6B, and the lubricating oil (arrow d) is supplied from the engine 2 to the rolling bearings 6A and 6B through the fluid passages 11A and 11B, the clearance L and the inclined holes 12A and 12B. The lubricating oil that has lubricated the rolling bearings 6A and 6B is drained by the aid of gravity, and returned to the engine 2 (as shown by an arrow e).

Figure 1:
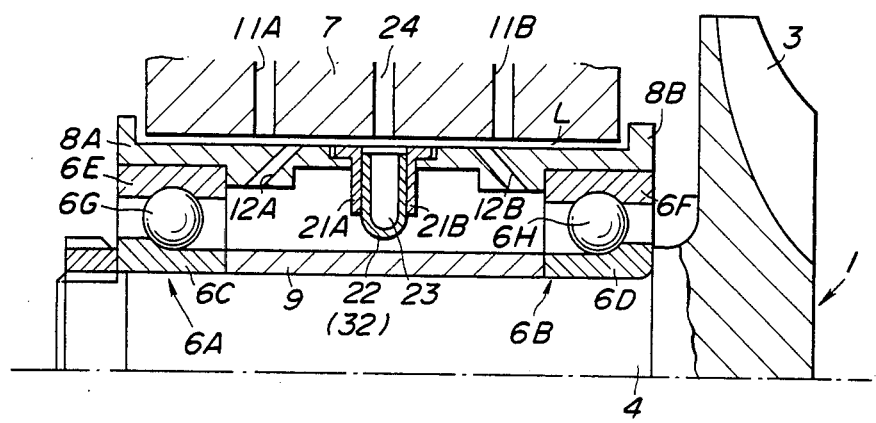
FIG. 1 is an upper half of a vertical sectional view showing a bearing structure according to the present invention.

A first embodiment of the present invention is shown in FIG. 1. In FIG. 1, the same reference numerals as used in FIG. 5 are used to designate similar parts. A bearing structure shown in FIG. 1 is different from the conventional structure of FIG. 5 in the following points.

As shown in FIG. 1, a pair of first and second retainers 21A and 21B of a ring shape are disposed between the first and second collar members 8A and 8B, and attached, respectively, to ends of the first and second collar members 8A and 8B. Each of the retainers 21A and 21B has a L-shaped cross section as shown in FIG. 1. A U-shaped elastic member 22 of a ring shape is disposed between the retainers 21A and 21B, and fastened to the retainers 21A and 21B. The elastic member 22 has a U-shaped cross section, and opens radially outwardly toward an inner surface of the bearing housing 7, as shown in FIG. 1. A lubricating oil chamber 23 (pressure chamber) is formed within the elastic member 22. The bearing housing 7 is formed with at least one central oil passage 24 opening toward the oil chamber 23 of the elastic member 22. The lubricating oil is supplied to the oil chamber 23 mainly from the central passage or passages 24. The elastic member 22 receives the oil pressure in the oil chamber 23, and pushes each of the collar members 8A and 8B in the thrust direction parallel to the axis of the shaft 4 with a force whose magnitude varies in accordance with the oil pressure in the oil chamber 23. Therefore, each of the rolling bearings 6A and 6B receives the force acting in the thrust direction and having the magnitude which is variable in accordance with the oil pressure in the oil chamber 23.

The turbocharger 1 having the thus-constructed bearing structure is operated as follows:

When the turbine wheel 3 is driven by the exhaust gases of the engine 2, the compressor wheel 5 supplies the compressed air to the engine 2. During this, the collar members 8A and 8B support the rotating shaft 4 through the rolling bearings 6A and 6B. The lubricating oil is supplied to the clearance L between the bearing housing 7 and the collar members 8A and 8B through the oil passages 11A, 11B and 24 formed in the bearing housing 7, so that an oil film is formed in the clearance. The collar members 8A and 8B are supported by the bearing housing 7 through this oil film. The lubricating oil is supplied to the oil chamber 23 formed by the elastic member 22 mainly through one or more central oil passages 24. The lubricating oil further flows from the clearance L through the inclined holes 12A and 12B formed in the collar members 8A and 8B, and spouts toward the rolling elements 6G and 6H of the first and second rolling bearings 6A and 6B.

Figure 2A:
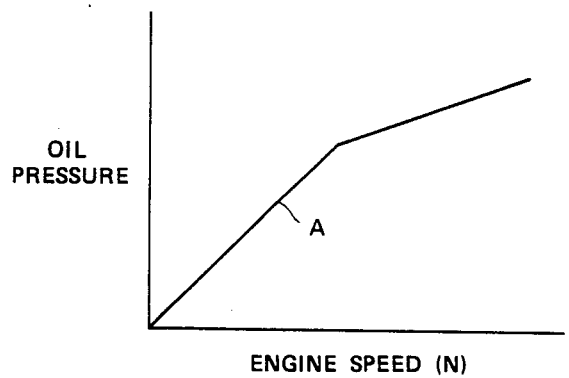
FIG. 2A is a graph showing a relationship between oil pressure and engine rpm.
Figure 2B:
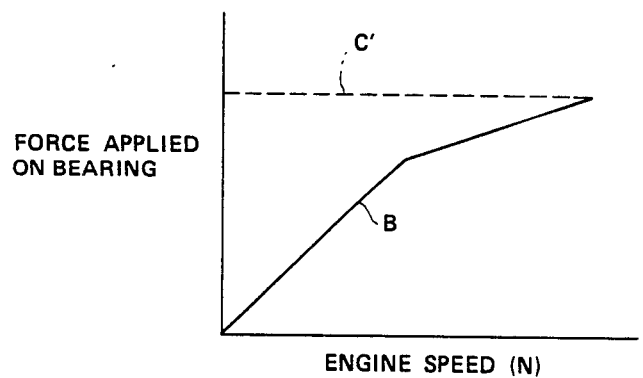
FIG. 2B is a graph showing a relationship between force applied on each rolling bearing and engine rpm.

The U-shaped elastic member 22 pushes each of the rolling bearings 6A and 6B through the retainer 21A or 21B and the collar member 8A or 8B with an axial force whose direction is parallel to the axis of the shaft 4 and whose magnitude is determined by the oil pressure in the oil chamber 23 and an effective area receiving the oil pressure. The oil pressure supplied to the oil chamber 23 increases as a rotational speed N of the engine 2 increases, as shown by a solid line A in FIG. 2A. Therefore, the magnitude of the axial force applied on each of the rolling bearings 6A and 6B by the elastic member 22 increases with increase in the engine rotational speed N, as shown by a solid line B in FIG. 2B. In the conventional example shown in FIG. 5, the axial force applied on each bearing is constant, as shown by a broken line C in FIG. 2B. In the bearing structure of the present invention, the magnitude of the axial force applied on each rolling bearing increases with increase in the engine rotational speed N, and approaches the constant magnitude of the conventional example in a high engine speed range. In a low engine speed range where so-called turbo-lag is problematical, the axial force applied on each bearing by the elastic member 22 of the present invention is small, so that the frictional resistance of each rolling bearing is decreased. Consequently, the structure of the present invention makes it easier for the turbine wheel 3 to increase its speed, and eliminates a turbo-lag, so that the engine output torque and the vehicle accelerating ability are improved. After lubricating the rolling bearings 6A and 6B, the lubricating oil is discharged by the aid of gravity, and returned to the engine 2.

Figure 3:
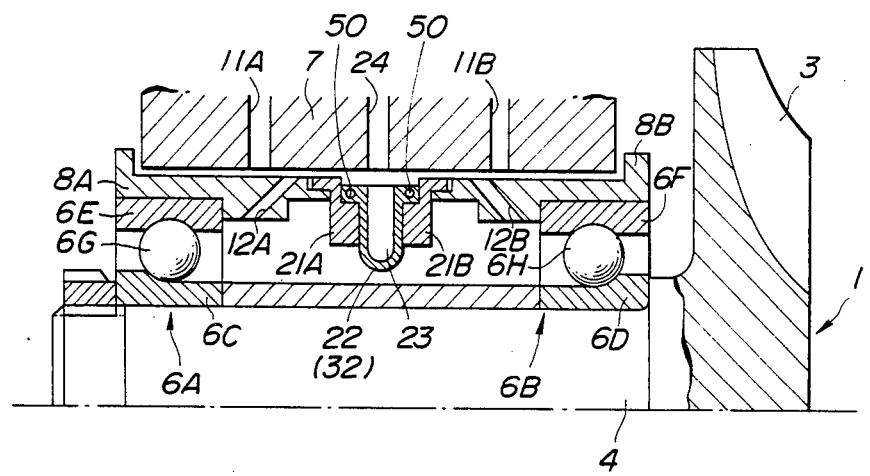
FIG. 3 is an upper half of a vertical sectional view similar to FIG. 1 but showing a modification.

FIG. 3 shows a modification of the structure of FIG. 1. A U-shaped elastic member 22 of FIG. 3 is formed with flanges for holding the elastic member 22 in place. The U-shaped elastic member 22 has a bottom portion, a first side portion extending radially outwardly from the bottom portion and abutting on the first collar member 8A, and a second side portion extending radially outwardly from the bottom portion and abutting on the second collar member 8B. The first side portion of the U-shaped elastic member 22 has an outer rim which is formed with a first flange projecting axially toward the first collar member 8A, and the second side portion has an outer rim which is formed with a second flange projecting axially toward the second collar member 8B. A wire 50 of a ring shape is embedded in each flange. Bead wire for tires may be used as the wire 50. Each of the retainers 21A and 21B is formed with a shoulder. The first flange of the elastic member 22 is mounted on the shoulder of the first retainer 21A, and the second flange is mounted on the shoulder of the second retainer 21B, so that the elastic member 22 is reliably positioned radially.

A second embodiment of the present invention employs a variable member 32, such as a shape memory alloy, capable of altering its shape in accordance with temperature change, instead of the elastic member 22 of the first embodiment. The variable member 32 has the same shape as the elastic member 22 shown in FIG. 1 or the elastic member 22 shown in FIG. 3.

The variable member 32 of the second embodiment alters its shape in accordance with both of the pressure and temperature of the lubricating oil supplied to the oil chamber 23 and by so doing, varies the magnitude of the axial force applied on each of the rolling bearings 6A and 6B in accordance with the pressure and temperature of the lubricating oil supplied to the oil chamber 23.

Figure 4:
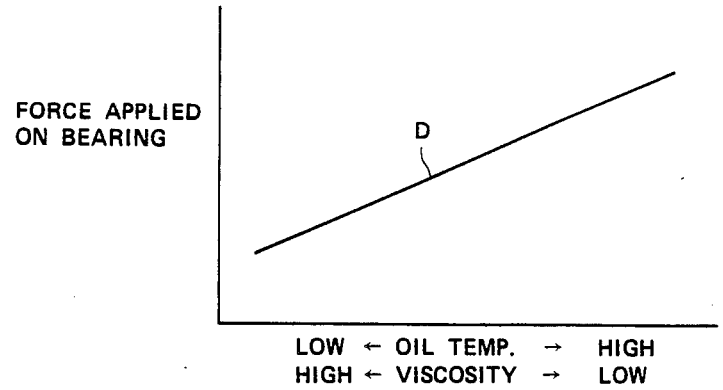
FIG. 4 is a graph showing a relationship between a minimum pushing force for providing durability and an oil temperature, obtained by another embodiment of the present invention.

When the temperature of the lubricating oil is low, the variable member 32 is not deformed, so that the magnitude of axial force applied on each bearing 6A or 6B only by the oil pressure is very small, as shown by a solid line D in FIG. 4. In this case, the viscosity of the lubricating oil is high because the oil temperature is low. Therefore, the oil film is not broken though the shaft 4 is allowed to move in the thrust direction to a limited extent. The frictional resistance of each rolling bearing 6A or 6B can be reduced.

When the temperature of the lubricating oil is high, the variable member 32 alters its shape so as to expand outwardly in the axial direction, and by so doing, applies the axial pushing force of a greater magnitude on each bearing 6A or 6B. Therefore, each of the rolling bearings 6A and 6B can receive a sufficient thrust load, so that the bearing structure of this embodiment can prevent breakage of the oil film notwithstanding the low viscosity of the lubricating oil, and prevent increase of the frictional resistance of each bearing 6A or 6B.

What is claimed is:

1. A bearing structure of a turbocharger for an internal combustion engine, comprising;
    a stationary bearing housing having at least one fluid passage for conveying a lubricating oil of said engine,
    first and second rolling bearings disposed in said bearing housing for supporting a rotating shaft,
    a first collar member interposed between said housing and said first bearing and a second collar member interposed between said housing and said second bearing, said first and second bearings being supported by said bearing housing through said first and second collar members, and
    preloading means disposed between said first and second collar members, said preloading means forming an oil chamber receiving the lubricating oil supplied through said fluid passage of said housing, and pushing each of said first and second collar members with a force whose magnitude is variable in dependence on an oil pressure in said oil chamber.

2. A bearing structure according to claim 1 wherein said preloading means comprises a U-shaped member having a U-shaped cross section opening radially outwardly, and forming said oil chamber therein, said U-shaped member being capable of expanding in accordance with the oil pressure in said oil chamber in such a manner that both ends of said U-shaped cross section moves apart from each other.

3. A bearing structure according to claim 2 wherein said preloading means further comprises a first retainer attached to said first collar member and a second retainer attached to said second collar member, said U-shaped member being disposed between said first and second retainers and fixed to said first and second retainers.

4. A bearing structure according to claim 3 wherein each side of said U-shaped member is formed with a flange projecting outwardly along said rotating shaft, and each of said retainers is formed with a recess receiving said flange.

5. A bearing structure according to claim 3 wherein said fluid passage of said bearing housing opens toward said U-shaped member.

6. A bearing structure according to claim 3 wherein said U-shaped member has elasticity.

7. A bearing structure according to claim 2 wherein said U-shaped member being capable of altering its shape in accordance with changes in temperature.

8. A bearing structure according to claim 7 wherein said U-shaped member is made of shape memory alloy.

* * * * *